United States Patent
Schneider et al.

(10) Patent No.: US 10,747,977 B2
(45) Date of Patent: Aug. 18, 2020

(54) IMAGING READER FOR, AND METHOD OF, READING SYMBOL AND NON-SYMBOL TARGETS WITH COLOR IMAGE PROCESSING PIPELINE HAVING BYPASSABLE COMPONENTS

(71) Applicant: SYMBOL TECHNOLOGIES, LLC, Lincolnshire, IL (US)

(72) Inventors: Gary G. Schneider, Stony Brook, NY (US); David P. Goren, Smithtown, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 560 days.

(21) Appl. No.: 15/174,184

(22) Filed: Jun. 6, 2016

(65) Prior Publication Data

US 2017/0351893 A1    Dec. 7, 2017

(51) Int. Cl.
| | |
|---|---|
| G06K 7/14 | (2006.01) |
| G06K 9/22 | (2006.01) |
| H04N 1/60 | (2006.01) |
| H04N 1/58 | (2006.01) |
| G06K 7/10 | (2006.01) |

(52) U.S. Cl.
CPC ......... *G06K 7/146* (2013.01); *G06K 7/10722* (2013.01); *G06K 9/228* (2013.01); *H04N 1/58* (2013.01); *H04N 1/6008* (2013.01); *H04N 1/6027* (2013.01); *H04N 1/6072* (2013.01); *H04N 1/6077* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 2010/0096463 A1* | 4/2010 | Perera | ................... | G06K 7/0004 235/470 |
| 2014/0217179 A1* | 8/2014 | Wang | ....................... | G06K 7/14 235/462.13 |

* cited by examiner

*Primary Examiner* — Christle I Marshall
(74) *Attorney, Agent, or Firm* — Yuri Astvatsaturov

(57) ABSTRACT

A color image of a target is captured by a color sensor in an imaging reader. A color image processing pipeline processes the captured color image with a plurality of color image processing components to display the image of a target with high fidelity. One or more of the components are bypassed to decode the image of a symbol target to prevent degradation of reader performance.

20 Claims, 4 Drawing Sheets

IMAGING READER FOR, AND METHOD OF, READING SYMBOL AND NON-SYMBOL TARGETS WITH COLOR IMAGE PROCESSING PIPELINE HAVING BYPASSABLE COMPONENTS

BACKGROUND OF THE INVENTION

The present invention relates generally to an imaging reader for, and a method of, electro-optically reading targets by image capture, and, more particularly, to a color image processing pipeline for processing color images of the targets captured by a solid-state color image sensor in the reader for either storing or displaying at least one of the targets, e.g., a non-symbol target, with high fidelity, or for decoding symbol targets without degrading reader performance.

Solid-state imaging systems or imaging readers have been used, in both handheld and/or hands-free modes of operation, to electro-optically read targets, such as one- and two-dimensional bar code symbols, and/or non-symbols, such as documents, drivers' licenses, receipts, damaged products, and like objects, people, places, or things, over a range of working distances relative to each reader. Each reader generally includes an imaging assembly having a solid-state imager or imaging sensor with an array of photocells or pixels, which correspond to image elements or pixels in an imaging field of view of the imager, and an imaging lens assembly for capturing return light scattered and/or reflected from the target being imaged, and for projecting the return light onto the imager to initiate capture of an image of each target. The imager may include a one- or two-dimensional charge coupled device (CCD) or a complementary metal oxide semiconductor (CMOS) device, and associated circuits for producing and processing electrical signals corresponding to a one- or two-dimensional array of output raw image data over the imaging field of view.

Many readers use monochrome imagers, which produce monochrome or gray scale images that are well suited for reading and decoding symbol targets. However, when the readers are also tasked with displaying targets, such as non-symbol targets, monochrome imagers have not proven to be that well suited for displaying non-symbol targets. Many users prefer to view images of non-symbol targets in color. In some cases, the color images may actually be clearer, or more informative, than the monochrome images. As a result, color imagers, which are typically overlaid and integrated with color filter arrays, such as Bayer filters, are becoming more prevalent in such readers that can read both symbol and non-symbol targets.

In order to display a target with high color fidelity, each such color imager employs a color image processing pipeline to process the output raw image data from the color imager. The pipeline is a set of components or processing blocks that are situated between the color imager and a display, such as a monitor or screen. Such pipeline components may typically include such components as a white balance component for adjusting pixel luminance among bands of red (R), blue (B) and green (G) colors in the output raw image data, a de-mosaic component for processing the output raw image data from the imager to reconstruct the captured color image, a pixel transform component for adjusting a bit depth of the output raw image data, a color correction component for applying a blending matrix to convert an RGB color space from the color imager to a different standard color space, a gamma correction component for adjusting image quality to add, remove, or modify nonlinearities in the output raw image data, a noise filter component for removing noise from the output raw image data, and an encoding component for converting between color image formats in the output raw image data.

Although the color image processing pipeline is generally satisfactory for its intended purpose of displaying a color image of a target with high fidelity, one or more of the pipeline components can sometimes degrade reader performance when the reader is decoding a symbol target. More particularly, the color correction component and/or the gamma correction component and/or the noise filter component can generate excess noise, and can, at least partially, and sometimes significantly, reduce the working distance range. This is unacceptable, especially in a venue that requires the targets to be read over an extended working distance range.

Accordingly, there is a need not to degrade reading performance in the decode mode in such readers having color imagers that can image and read both symbol and non-symbol targets.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
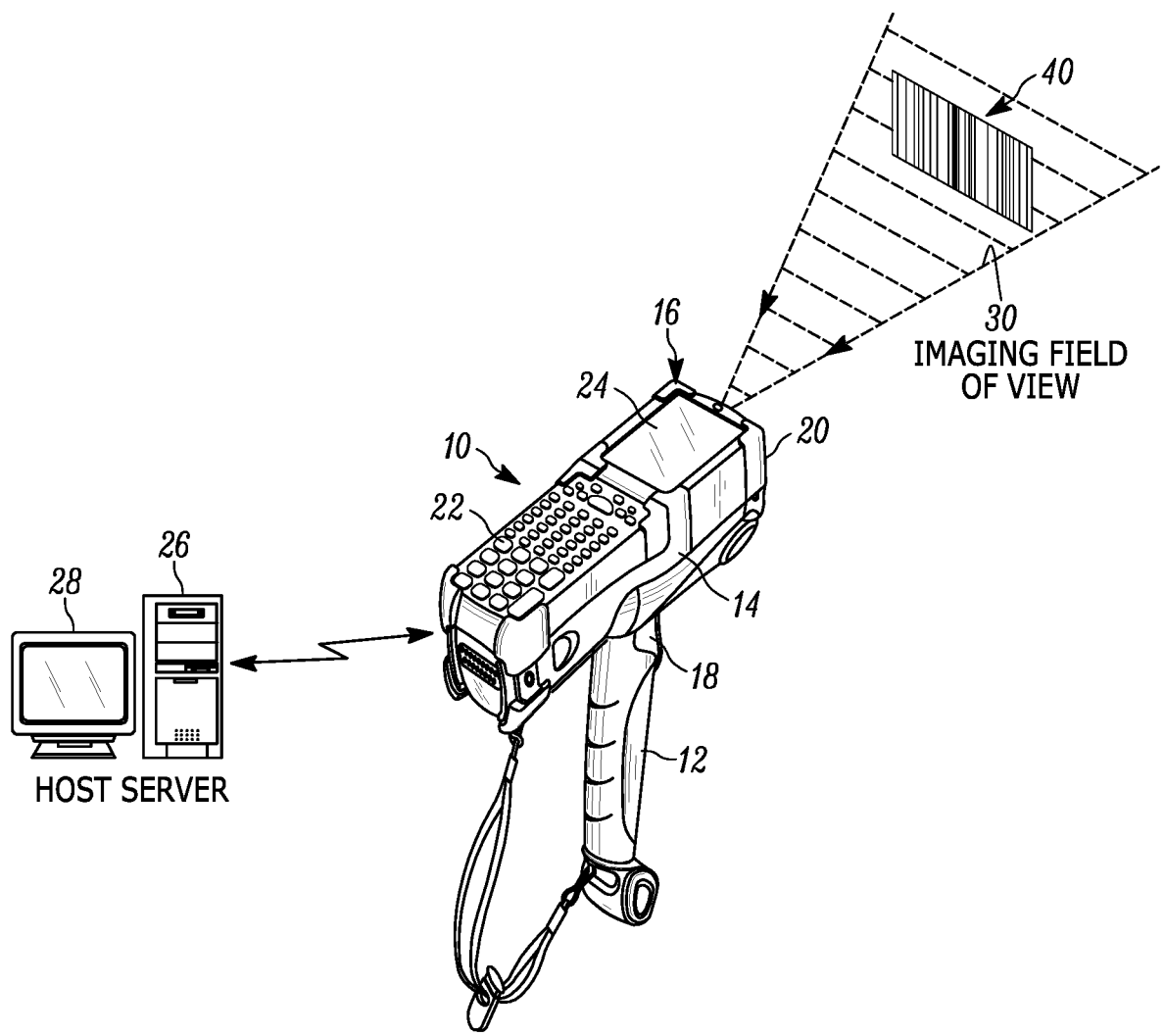
FIG. 1 is a view of a handheld imaging reader whose reading performance is not to be degraded when reading and decoding symbol targets in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The pipeline, reader, and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging reader for reading targets by image capture. The reader has an imaging assembly including a solid-state color imaging sensor, e.g., a charge coupled device (CCD) or a complementary metal oxide semiconductor (CMOS) device, and a color filter array, e.g., a Bayer filter, for capturing color images of the targets. A controller is operative for controlling the reader to operate in either an image capture mode in which a color image of at least one of the targets is captured, or in a decode mode in which a color image of a symbol target is decoded. A color image processing pipeline includes a set of color image processing components or processing blocks for processing the captured color image of the at least one target in the image capture mode. The set of color image processing components can display or store the captured color image, or can send the captured color image to a remote host for further processing. The set of color image processing components is connected in a first path and include one or more of the following: a white balance component for adjusting pixel luminance among bands of red (R), blue (B) and green (G) colors in an output raw image data from the color imager, a de-mosaic component for processing the output raw image data from the imager to reconstruct the captured color image, a pixel transform component for adjusting a bit depth of the output raw image data, a color correction component for applying a blending matrix to convert an RGB color space from the color imager to a different standard color space, a gamma correction component for adjusting image quality to add, remove, or modify nonlinearities in the output raw image data, a noise filter component for removing noise from the output raw image data, and an encoding component for converting between color image formats in the output raw image data.

One or more of such color image processing components, e.g., the color correction component, the gamma correction component, and the noise filter component, can sometimes degrade reader performance in the decode mode, for example, by adding noise, and by reducing a range of working distances in which the targets may be read. In accordance with this disclosure, a subset of the color image processing components without the at least one color image processing component is operative for processing the color image of the symbol target along a different, second path for decoding in the decode mode. In a preferred embodiment, a bypass component is incorporated in the pipeline and is operative for bypassing such noise-adding components in the decode mode to prevent degradation of the reader performance in the decode mode. The color image processing components without the bypassed noise-adding components are operative for processing the captured color image of the symbol target for decoding. Advantageously, the bypass component includes an actuatable control switching assembly for switching the noise-adding components out of the first path. The control switching assembly may be actuated in response to a manual action performed by an operator of the reader, or automatically by the controller.

Another aspect of the present disclosure relates to a method of reading targets by image capture with an imaging reader. The method is performed by capturing color images of the targets; by operating the imaging reader in one of an image capture mode in which a color image of at least one of the targets is captured, and in a decode mode in which a color image of a target configured as a symbol target is decoded, and by processing the captured color image of the at least one target in the image capture mode with a set of color image processing components along a first path. At least one of the color image processing components degrades reader performance in the decode mode. In accordance with this disclosure, the method is further performed by processing the color image of the symbol target along a different, second path for decoding in the decode mode with a subset of the color image processing components without the at least one color image processing component. In a preferred embodiment, the method is performed by bypassing the at least one color image processing component in the decode mode to prevent degradation of the reader performance in the decode mode, and by processing the captured color image of the symbol target for decoding with the color image processing components and without the bypassed at least one color image processing component.

Turning now to the drawings, reference numeral 10 in FIG. 1 generally identifies a mobile, handheld reader for electro-optically reading both symbol and non-symbol targets 40 by image capture. As illustrated, the imaging reader 10 has a lower handle 12 to be gripped in a user's hand, and an upper barrel 14 arranged in a gun-shaped housing 16 having a trigger 18 that is manually depressed by the user's forefinger to initiate reading of each target 40. The target 40 can be a symbol, such as a one- or two-dimensional bar code symbol associated with, or borne on, a product, or the target 40 can be a non-symbol, such as a document, a driver's license, a receipt, a damaged product, and, in short, any object, person, place or thing, and particularly, an item associated with the symbol target. A light-transmissive window 20 (best seen in FIG. 2) is mounted on the housing 16 at the front end region of the barrel 14. A keyboard 22 with numeric, alphabetic and function keys for manual data/function entry is mounted on the housing 16 within ready manual access to an operator. A display 24 is also mounted on the housing 16 within ready visual access to the operator for visually displaying images/prompts/device information to the operator.

The reader 10 is operatively connected, either by a wired or wireless connection, to a host server 26 that has a display monitor 28. The reader 10 can thus be used in a handheld mode in which the reader 10 is aimed at each target 40 to be read, followed by manual depression of the trigger 18 to initiate reading. Although the illustrated reader 10 has been shaped and configured as a mobile, handheld reader, it will be understood that this is merely exemplary, because the reader can have myriad other shapes and configurations including, but not limited to, stationary presentation readers, such as vertical slot scanners, flat-bed scanners, and bi-optic, dual-window scanners or workstations.

Figure 2:
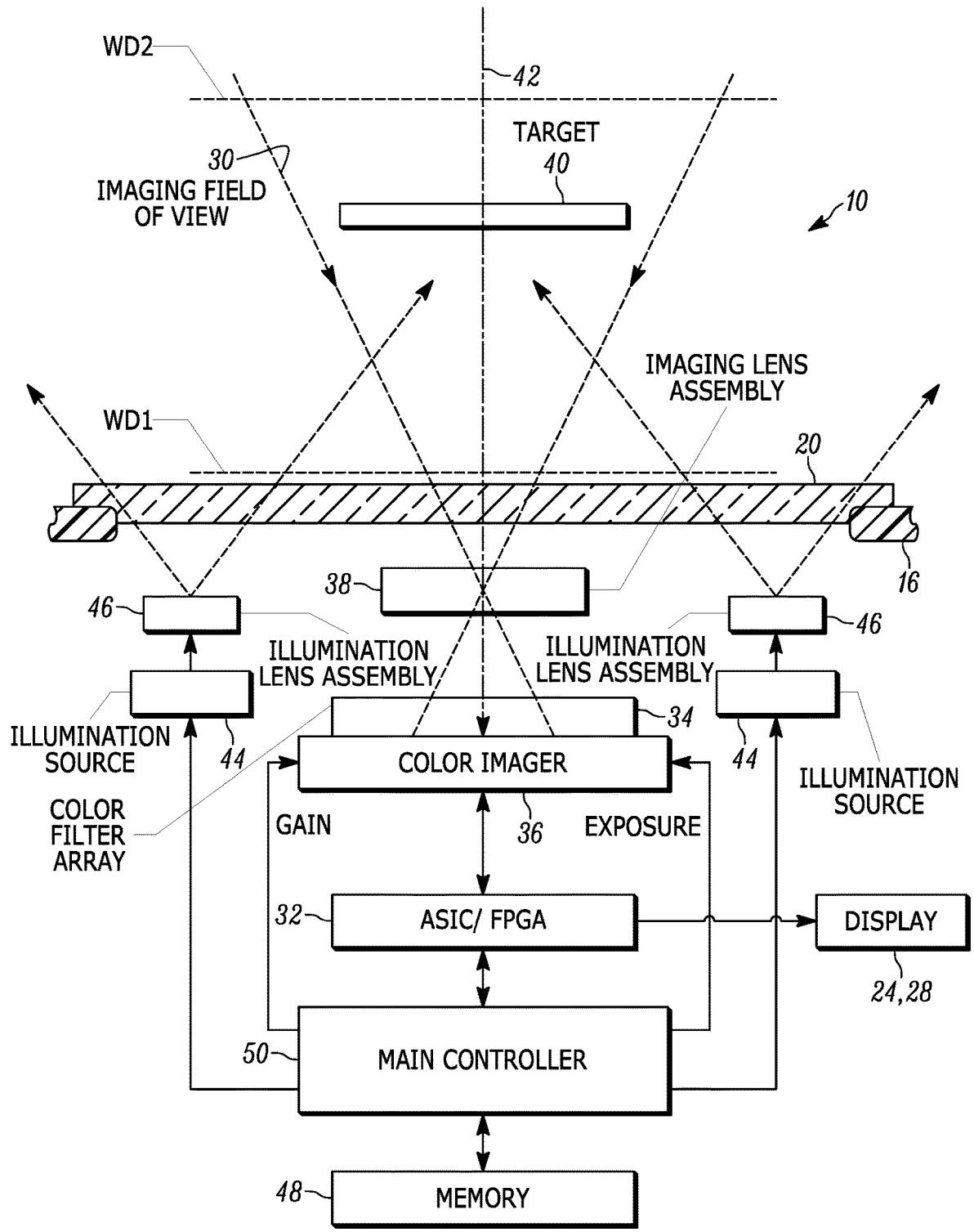
FIG. 2 is a diagrammatic view depicting components of the reader of FIG. 1.

FIG. 2 schematically depicts an imaging module or scan engine mounted in the reader 10 behind the window 20. The imaging module includes an imaging assembly having a solid-state, color imager or image sensor 36, a color filter array 34 overlaid on, and integrated with, the color imager 36, and an imaging lens assembly 38, which may have one or more imaging lenses. The color imager 36 has an array of pixels or photocells and may be a one- or two-dimensional charge coupled device (CCD) or a complementary metal oxide semiconductor (CMOS) device, and is analogous to the color image sensors used in electronic digital cameras. The color filter array 34 is preferably, but not necessarily, a Bayer filter. The imaging lens assembly 38 is preferably, but not necessarily, a Cooke triplet. The pixels are typically arranged in mutually orthogonal rows and columns. The color imager 36, the color filter array 34, and the lens assembly 38 are together operative for capturing return light scattered and/or reflected from each target 40 to be read by image capture over an imaging field of view 30 along an optical path or axis 42 through the window 20 and over a range of working distances between a close-in working distance (WD1) and a far-out working distance (WD2). In a preferred embodiment, WD1 is either at, or about a half inch away from, the window 20, and WD2 can be two feet and more from the window 20, although other numerical values are contemplated.

The reader 10 also supports an energizable illuminating light assembly for illuminating the targets 40 with illumination light from an illumination light source when energized, and is of particular benefit in dimly lit environments, or when the targets 40 are located far away from the reader 10. The illuminating light assembly includes, as illustrated, a pair of illumination light sources or light emitting diodes (LEDs) 44, and a corresponding pair of illumination lens assemblies 46 to uniformly illuminate the target 40 with illumination light when energized. The illumination LEDs 44 and the illumination lens assemblies 46 are preferably symmetrically located at opposite sides of the color sensor 36. Other configurations of the illuminating light assembly are contemplated.

As also shown in FIG. 2, a main controller or programmed microprocessor 50 controls operation of the electrical components of the assemblies, processes the captured return light from the target 40 as a color image, and either decodes the captured color image of each target configured as a symbol target, or displays, stores, or otherwise processes the captured color image of each target configured as a symbol target or as a non-symbol target, as described below. A memory 48 is connected, and accessible, to the main controller 50. The main controller 50 includes an illumination controller for each LED 44, an exposure controller for controlling the exposure time of the color imager 36, and a gain controller for controlling the gain of the color imager 36. The exposure and gain controllers are preferably software-based and integrated with the main controller 50, but they could also be hardware-based. Each illumination controller is preferably hardware-based, but could also be software-based and integrated with the main controller 50.

Figure 3:
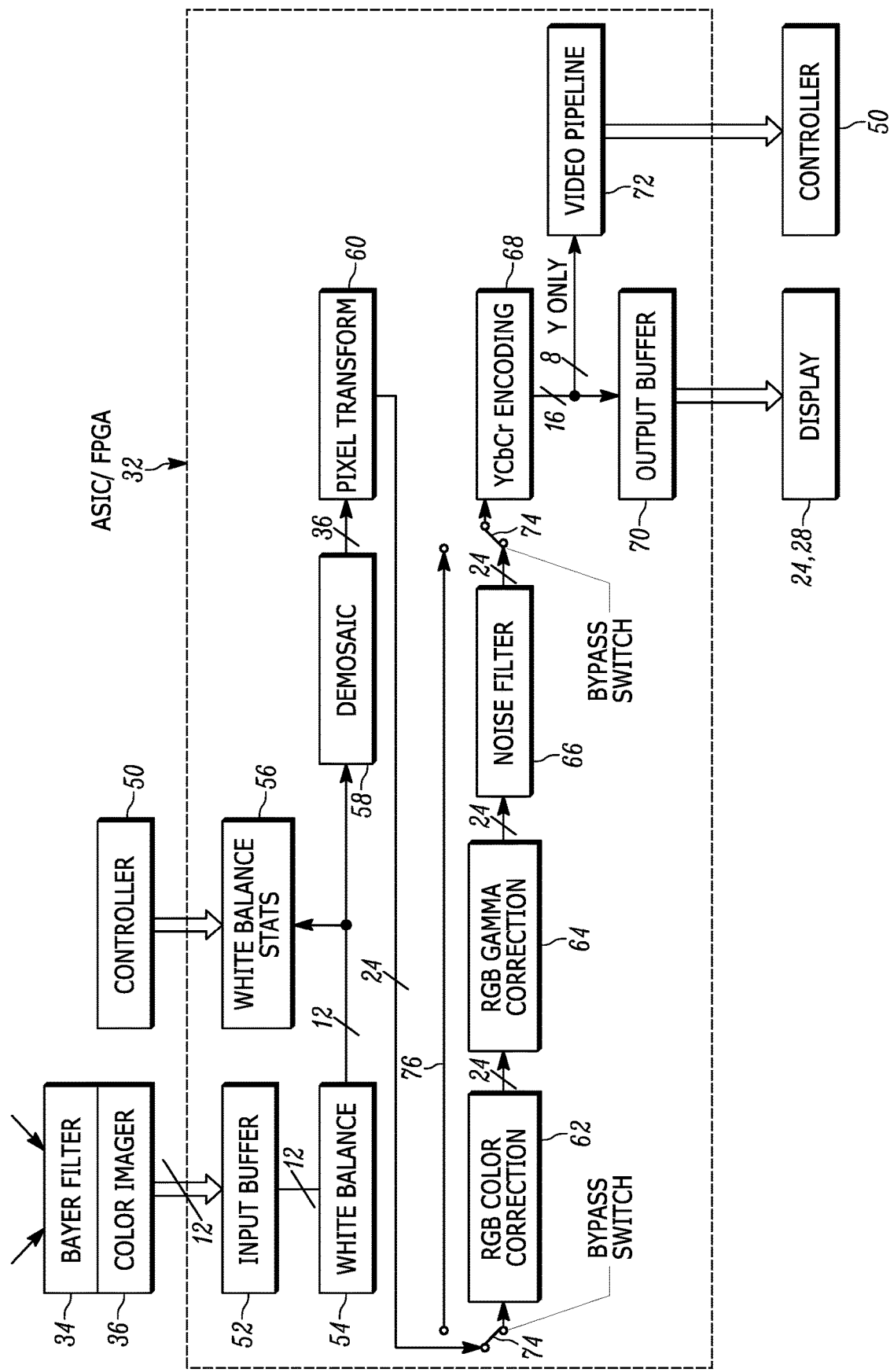
FIG. 3 is a block diagram of a color image processing pipeline that is implemented in one of the components of FIG. 2.

As further shown in FIG. 2, a programmed processor 32, which is configured either as an application-specific integrated circuit (ASIC), or as a field-programmable gate array (FPGA), is connected among the color imager 36, the main controller 50, and either display 24 or 28. In some applications, the processor 32 and the main controller 50 are integrated in a single chip or integrated circuit. A color image processing pipeline is implemented and integrated within the processor 32. As best shown in FIG. 3, the pipeline includes a plurality or set of color image processing components or processing blocks for processing the captured color image from each target. When the target is a symbol target or a non-symbol target, then the reader 10 is set by the controller 50 to operate in an image capture mode in which the pipeline processes the captured color image for display in high fidelity on either the display 24 provided locally on the reader 10, or the display 28 provided remotely from the reader 10, or for storage in the memory 48, or sends the captured color image to a remote host for further processing. When the target is a symbol target, then the reader 10 is set by the controller 50 to operate in a decode mode in which the pipeline processes the captured color image for decode by the main controller 50.

Thus, as shown in FIG. 3, the color image processing components are arranged in a first path and include an input buffer 52 for receiving and buffering output raw image data from the color imager 36. As shown, the raw image data has a 12-bit depth, although other bit depths may be employed. A white balance component 54 adjusts pixel luminance among bands of red (R), blue (B) and green (G) colors in the output raw image data from the input buffer 52. The white balance statistics may be monitored by the controller 50 at block 56. A de-mosaic component 58 processes the 12-bit output image data from the white balance component 54 to reconstruct the captured color image with the three RGB colors and outputs a 36-bit image data stream. A pixel transform component 60 adjusts the bit depth of the 36-bit image data stream to a 24-bit image data stream.

An RGB color correction component 62 applies a blending matrix to convert an RGB color space from the color imager 36 to a different standard color space in the 24-bit image data stream. A gamma correction component 64 adjusts the image quality to add, remove, or modify non-linearities in the 24-bit image data stream received from the color correction component 62. A noise filter component 66 removes noise from the 24-bit image data stream received from the gamma correction component 64. A YCbCr encoding component 68 converts the 24-bit image data stream received from the noise filter 66 in an RGB color image format to a YCbCr format, and reduces the bit-depth to 16 bits. Y is the luma or brightness component, and Cb and Cr are the chrominance or color components. YCbCr is a color space that takes human perception into account, allowing reduced bandwidth for the chrominance components, thereby typically enabling transmission errors or compression artifacts to be more efficiently masked by human perception, rather than by using a direct RGB-representation. The 16-bit YCbCr-encoded output data stream is received by an output buffer 70 prior to being delivered to either display 24 or 28. Only the Y or brightness component of the 16-bit YCbCr-encoded output data is delivered as an 8-bit data stream to a video pipeline 72 prior to delivery to the main controller 50 for decoding.

As previously mentioned, one or more of the color image processing components in the first path can sometimes degrade reader performance in the decode mode. More particularly, the color correction component 62 and/or the gamma correction component 64 and/or the noise filter component 66 can generate excess noise, and can, at least partially, and sometimes significantly, reduce the working distance range in which the targets 40 can be read. This disclosure is addressed to preventing the reader performance from being so degraded.

In accordance with this disclosure, a subset of the color image processing components without the noise-adding components 62, 64, and 66 is operative for processing the color image captured from the symbol target along a different, second path for decoding in the decode mode of the reader. In a preferred embodiment, a bypass component is incorporated in the pipeline and is operative for bypassing such noise-adding components 62, 64, and 66 in the decode mode to prevent degradation of the reader performance in the decode mode. Advantageously, the bypass component includes an actuatable control switching assembly having a pair of bypass switches 74 and a bypass second path 76 for switching the noise-adding components 62, 64, and 66 out of the first path. As shown, the noise-adding components 62, 64, and 66 are in the first path and process the output data stream from the pixel transform component 60. When the bypass switches are both actuated, the noise-adding components 62, 64, and 66 are taken out the first path, and the output data stream from the pixel transform component 60 is conveyed along the bypass path 76 directly to the YCbCr encoding component 68.

The bypass switches 74 may be actuated in response to a manual action performed by an operator of the reader, e.g., by pressing a control button on the keyboard 22, or by reading a predetermined, special parameter symbol that is recognized by the controller 50 to set the decode mode. The bypass switches 74 may also be actuated automatically by the controller 50. For example, the controller 50 can recognize whether the target is a symbol target or a non-symbol target, and can automatically actuate the bypass switches 74 when it recognizes a symbol target.

Figure 4:
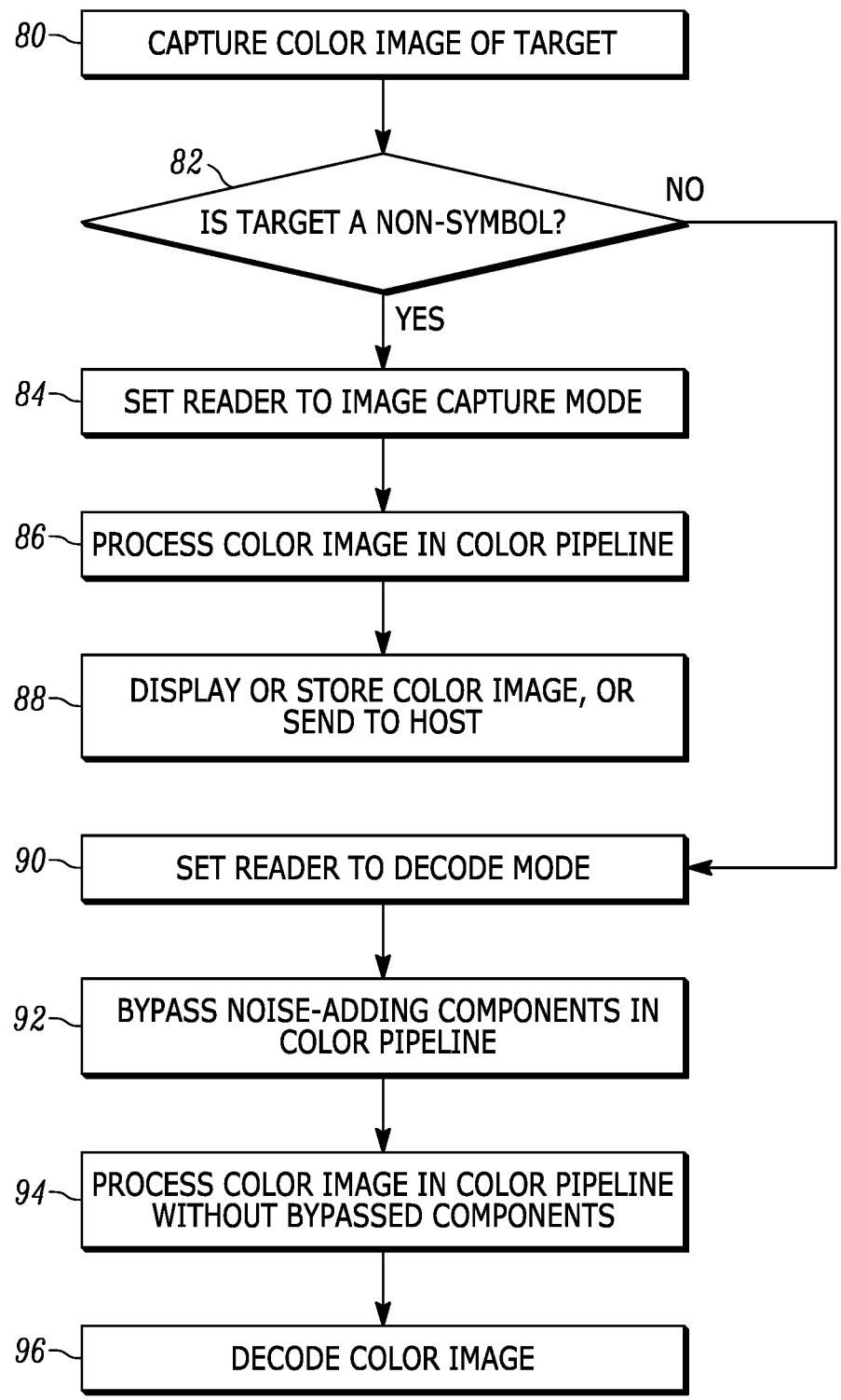
FIG. 4 is a flow chart depicting steps performed in a method in accordance with the present disclosure.

The method of this disclosure is performed, as shown in the flow chart of FIG. 4, by capturing a color image of the target 40 with the color imager 36 in step 80. In step 82, it is determined whether the target 40 is a non-symbol. If so, then the reader 10 is set to the image capture mode in step 84, and the captured color image is processed by all the processing components in the color pipeline in step 86, and the processed color image is displayed on either display 24 or 28, or is stored in the memory 46, or is sent to a remote host, in step 88. If not, then the reader 10 is set to the decode mode in step 90, and the noise-adding components 62, 64, and 66 are bypassed in step 92, and the captured color image is processed without the bypassed components in the color pipeline in step 94, and the processed color image is decoded by the controller 50 in step 96.

In the foregoing specification, specific embodiments have been described. However, one of ordinary skill in the art appreciates that various modifications and changes can be made without departing from the scope of the invention as set forth in the claims below. For example, rather than actuating the bypass switches 74 to bypass the noise-adding components 62, 64, and 66, the color pipeline may be provided with two parallel paths, one that includes all the aforementioned processing components, and the other that includes all the aforementioned processing components but without the noise-adding components 62, 64, and 66. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging reader for reading targets by image capture, the reader comprising:
   an imaging assembly including a solid-state color imager and a color filter array, the imaging assembly being operative for capturing color images of the targets;
   a controller for controlling the reader to operate in one of an image capture mode in which a color image of at least one of the targets is captured, and in a decode mode in which a color image of a target configured as a symbol target is decoded; and
   a color image processing pipeline including a set of color image processing components for processing the captured color image of the at least one target along a first path in the image capture mode, at least one of the color image processing components degrading reader performance in the decode mode, and a subset of the color image processing components without the at least one color image processing component being operative for processing the color image of the symbol target along a different, second path for decoding in the decode mode.

2. The reader of claim 1, wherein the color image processing pipeline includes a bypass component for bypassing the at least one color image processing component in the decode mode to prevent degradation of the reader performance in the decode mode, the color image processing components without the bypassed at least one color image processing component being operative for processing the captured color image of the symbol target for decoding.

3. The reader of claim 2, wherein the set of color image processing components includes a white balance component for adjusting pixel luminance among bands of red (R), blue (B) and green (G) colors in output raw image data from the color imager, a de-mosaic component for processing the output raw image data from the color imager to reconstruct the captured color image, a pixel transform component for adjusting a bit depth of the output raw image data, a color correction component for applying a blending matrix to convert an RGB color space from the color imager to a different standard color space, a gamma correction component for adjusting image quality to modify nonlinearities in the output raw image data, a noise filter component for removing noise from the output raw image data, and an encoding component for converting between color image formats in the output raw image data.

4. The reader of claim 3, wherein the at least one color image processing component that is bypassed includes at least one of the color correction component, the gamma correction component, and the noise filter component.

5. The reader of claim 1, wherein the at least one color image processing component includes at least one of a color correction component, a gamma correction component, and a noise filter component.

6. The reader of claim 2, wherein the set of color image processing components are connected along the first path, and wherein the bypass component includes an actuatable control switching assembly for switching the at least one color image processing component that is bypassed out of the first path.

7. The reader of claim 6, wherein the control switching assembly is actuated in response to a manual action performed by an operator of the reader.

8. The reader of claim 6, wherein the control switching assembly is actuated automatically by the controller.

9. The reader of claim 1, and a processor in which the set of color image processing components is integrated.

10. A color image processing pipeline for processing output raw image data from a color imager in an imaging reader for reading targets by image capture, the color pipeline comprising:
a set of color image processing components for processing the output raw image data captured from at least one of the targets along a first path in an image capture mode of the reader, at least one of the color image processing components degrading reader performance in the decode mode, and
a subset of the color image processing components without the at least one color image processing component being operative for processing the output raw image data captured from a symbol target along a different, second path for decoding in a decode mode of the reader.

11. The color pipeline of claim 10, wherein the color image processing components include a bypass component for bypassing the at least one color image processing component in the decode mode to prevent degradation of the reader performance in the decode mode, the color image processing components without the bypassed at least one color image processing component being operative for processing the output raw image data captured from the symbol target for decoding.

12. The color pipeline of claim 11, wherein the plurality of color image processing components includes a white balance component for adjusting pixel luminance among bands of red (R), blue (B) and green (G) colors in the output raw image data from the color imager, a de-mosaic component for processing the output raw image data from the color imager to reconstruct the captured color image, a pixel transform component for adjusting a bit depth of the output raw image data, a color correction component for applying a blending matrix to convert an RGB color space from the color imager to a different standard color space, a gamma correction component for adjusting image quality to modify nonlinearities in the output raw image data, a noise filter component for removing noise from the output raw image data, and an encoding component for converting between color image formats in the output raw image data; and wherein the at least one color image processing component that is bypassed includes at least one of the color correction component, the gamma correction component, and the noise filter component.

13. A method of reading targets by image capture with an imaging reader, the method comprising:
capturing color images of the targets with a color imager;
operating the imaging reader in one of an image capture mode in which a color image of at least one of the targets is captured, and in a decode mode in which a color image of a target configured as a symbol target is decoded;
processing the captured color image of the at least one target in the image capture mode with a set of color image processing components along a first path, at least one of the color image processing components degrading reader performance in the decode mode; and
processing the color image of the symbol target along a different, second path for decoding in the decode mode with a subset of the color image processing components without the at least one color image processing component.

14. The method of claim 13, wherein the processing with the subset of the color image processing components is performed by bypassing the at least one color image processing component in the decode mode to prevent degradation of the reader performance in the decode mode.

15. The method of claim 14, and configuring the set of color image processing components to include a white balance component for adjusting pixel luminance among bands of red (R), blue (B) and green (G) colors in output raw image data from the color imager, a de-mosaic component for processing the output raw image data from the color imager to reconstruct the captured color image, a pixel transform component for adjusting a bit depth of the output raw image data, a color correction component for applying a blending matrix to convert an RGB color space from the color imager to a different standard color space, a gamma correction component for adjusting image quality to modify nonlinearities in the output raw image data, a noise filter component for removing noise from the output raw image data, and an encoding component for converting between color image formats in the output raw image data.

16. The method of claim 15, and configuring the at least one color image processing component that is bypassed to include at least one of the color correction component, the gamma correction component, and the noise filter component.

17. The method of claim 13, and configuring the at least one color image processing component to include at least one of a color correction component, a gamma correction component, and a noise filter component.

18. The method of claim 14, and connecting the set of color image processing components along the first path, and wherein the bypassing is performed by switching the at least one color image processing component out of the first path.

19. The method of claim 18, wherein the bypassing is performed in response to a manual action performed by an operator of the reader.

20. The method of claim 18, wherein the bypassing is performed automatically.

* * * * *